United States Patent Office 2,736,759
Patented Feb. 28, 1956

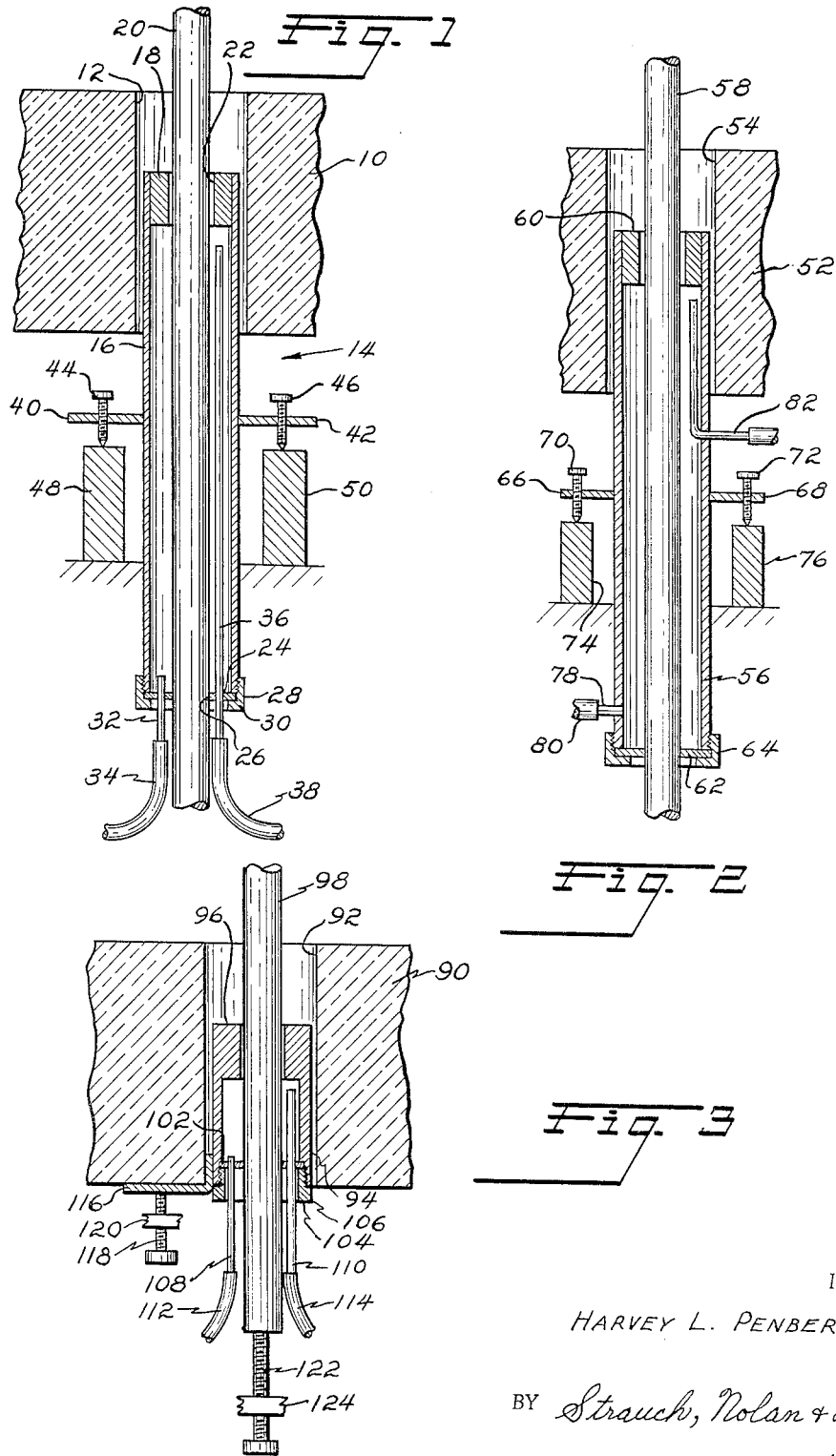

2,736,759

ELECTRODE ASSEMBLY FOR GLASS FURNACES

Harvey L. Penberthy, Seattle, Wash.

Application October 22, 1954, Serial No. 464,004

15 Claims. (Cl. 13—17)

This invention relates to glass furnaces and more particularly to a novel arrangement for mounting and feeding electrodes into such furnaces.

Cooled electrode assemblies in use heretofore have for the most part consisted of water cooling jackets through which the electrode passes with a tight sealing fit and into which coolant is introduced. Considerable difficulty has been experienced with this type of arrangement in that the jacket had to be sealingly fitted into the thermal wall and had to have a coefficient of thermal expansion the same as or closely proximate that of the electrode. Difficulty was experienced, however, even when the coefficients were accurately matched due to the different temperatures of the cooled jacket and glass heated electrode. In addition to the foregoing difficulties it was found that the cooling effect was relatively inefficient and the jacket was frequently extended right up to the molten glass.

In my application No. 371,858, now Patent No. 2,693,498, there is disclosed an electrode assembly wherein an electrode passes through an open elongated sleeve into which a cooling fluid is fed to impinge upon the electrode and thus cool the same. While this assembly has been found satisfactory for horizontal electrode mountings it has been found that where the electrode is mounting vertically in the bottom wall of a tank the cooling efficiency of the fluid fed into the sleeve falls off and much of the fluid exercises very little cooling function.

According to the present invention there is provided an electrode which extends through a relatively loose fitting bushing into the glass furnace. An elongated sleeve surrounds the electrode and bushing and is provided with a means for feeding coolant into direct contact with the electrode and bushing. The bushing has a substantial axial length so that a gradual drop in temperature occurs between its inner surface which is in contact with glass and its outer surface which is in contact with the coolant fluid. Molten glass which would otherwise tend to escape between the relatively loose fitting bushing and electrode solidifies therebetween sealing the tank. The bushing is preferably situated outward of the inner face of the tank wall so that it is not subjected to the highest glass temperatures which results in a further more efficient use of the coolant. The loose fitting between the bushing and electrode eliminates the binding difficulties experienced in the past and makes it unnecessary to match the thermal coefficients of expansion of the electrode and bushing.

According to the preferred embodiment of the invention the coolant feed means consists of a short feed tube which passes through a flexible washer sealing the outer end of the sleeve and a long feed tube passing through the washer and extending to within a very short distance of the bushing which is normally between the faces of the furnace wall. By means of this arrangement all of the fluid utilized for cooling passes into direct contact with the electrode to be cooled and with the bushing and exercises its cooling function in a countercurrent type heat exchange so as to obtain the maximum possible efficiency.

It is accordingly a primary object of the present invention to provide an improved electrode mounting structure for feeding an electrode to a glass furnace while cooling such electrode to prevent excessively rapid deterioration.

It is another object of this invention to provide an improved electrode mounting structure for glass furnaces wherein fluid coolant is utilized most efficiently.

It is another object of the present invention to provide an improved electrode mounting structure wherein the coolant comes into direct contact with the electrode and flows counter to the heat gradient therein.

It is another object of the present invention to provide an electrode mounting assembly for glass furnaces wherein the electrode passes through a relatively loose fitting bushing so as to permit advancement of the electrode into the furnace while at the same time providing a glass seal around the electrode during operation of the furnace.

It is another object of the present invention to provide an electrode assembly for glass furnaces wherein the full cooling effect of the coolant is utilized on a vertical electrode.

It is another object of the present invention to provide an electrode assembly comprising an electrode and a sleeve surrounding such electrode wherein coolant is fed into the annular space therebetween, upwardly around the electrode, and thence is discharged.

It is another object of the present invention to provide an electrode assembly comprising an electrode loosely passing through a bushing enclosed in an elongated sleeve wherein the bushing is mounted between the faces of a tank wall and fluid coolant is fed direct to the electrode and bushing.

It is another object of the present invention to provide a cooled electrode assembly for a glass furnace which is simple in construction and low in cost and which utilizes a fluid coolant in an efficient manner.

It is a still further object of the present invention to provide such a low cost cooled electrode assembly for a glass furnace which may be assembled from available stock materials.

It is still a further object of the present invention to provide an electrode assembly comprising an electrode and a sleeve and bushing surrounding such electrode wherein coolant is fed into the annular space between the electrode and sleeve proximate the bushing and flows away therefrom.

Further objects and advantages of the invention will become apparent upon reference to the following specification and claims and appended drawings wherein:

Figure 1 is a cross sectional view of an electrode assembly according to one embodiment of the invention mounted in the bottom wall of a glass furnace;

Figure 2 is a cross sectional view of another embodiment of an electrode assembly according to the invention mounted in the bottom wall of a glass furnace; and Figure 3 is a cross sectional view of another embodiment of an electrode assembly according to the invention.

Referring more particularly to Figure 1 there is shown a tank block or floor 10 having an aperture 12 therein to receive an electrode assembly shown generally at 14. The electrode assembly 14 consists of an elongated sleeve or conduit 16 which may be of any suitable metal, such as steel, in which there is mounted at one end thereof a bushing 18 of any suitable material such as steel. Extending axially through the sleeve 16 is an electrode 20 which may, for instance, be of molybdenum and which passes slidably through an aperture 22 in the bushing 18.

It has been discovered that if the bushing 18 is retracted from the inner surface of the furnace wall 10 the cooling requirements are considerably reduced and the glass which enters the aperture 12 and contacts the bushing 18 is at a temperature substantially below the temperature of the glass in the tank. The cooling necessary to protect the air exposed portion of the electrode may be further reduced by using a bushing 18 having a substantial length in relation to the thickness of the tank block 10, in that such a bushing acts as a partial insulator between the glass in contact with one side thereof and the coolant in contact with the other surface. It is thus a feature of the invention that the coolant does not come into contact with a relatively thin wall which is itself in contact with the high temperature glass in the tank, it having been found that in such circumstances the coolant needlessly and deleteriously cools the glass in the tank.

The protruding end of the sleeve 16 is provided with a flexible washer 24 having an aperture 26 therein for sealingly engaging the electrode 20. The washer 24 is sealed to the mouth of the sleeve 16 by means of a threaded ring 28 having an inturned flange 30.

Extending through the washer 24 and into the sleeve 16 for a short distance is a coolant fluid inlet tube 32 which may be provided with a supply of coolant through a flexible conduit 34. A coolant outlet tube 36 also extends through the washer 24 into the sleeve 16 and along substantially the entire length thereof to a point just short of the bushing 18 and this tube is provided with a discharge connection such as a flexible conduit 38.

The electrode assembly is maintained in position against the pressure of the molten glass in the furnace and also against gravity by means of brackets 40 and 42 which have screws 44 and 46 screw-threadedly engaged therein and resting upon a pair of blocks 48 and 50 on any suitable support. Adjustment of the screws 44 and 46 permits vertical adjustment of the electrode assembly into the glass furnace.

In operation a supply of coolant such as water or compressed air is fed into the inlet tube 32 and flows upwardly along the electrode 20 until it reaches the bushing 18 whereupon the coolant is removed through the outlet tube 36. Since the electrode 20 is coolest at the air exposed portion and hottest in the glass furnace, the coolant exercises its cooling function according to the countercurrent flow principle and does not come into contact with a thin wall which is itself in contact with the molten glass in the tank. All of the cooling effect of the coolant is thus exercised upon the electrode and bushing and none of the coolant is permitted to escape without having its temperature raised by the electrode. The small annular space between the electrode and the aperture 22 of the bushing 18 is filled with glass which has solidified under the effect of the coolant and there is also solidification of glass on the other side of the bushing which acts as a further insulator between the extremely high temperature of the molten glass in the furnace and the temperature of the coolant on the other side of the bushing.

The electrode may be fed into the furnace by merely stopping the supply of coolant to allow the solidified glass to soften.

Referring to Figure 2 there is shown another embodiment of the invention wherein a tank block 52 having an aperture 54 is provided with an elongated sleeve or conduit 56 which houses an electrode 58. At the furnace end of the sleeve 56 a relatively loose fitting bushing 60 is provided at a position retracted from the inner surface of the tank block. The other end of the sleeve is provided with a flexible washer 62 sealed to the sleeve 56 by means of a sealing ring 64. The entire sleeve assembly is supported by means of a pair of brackets 66 and 68 having mounted therein a pair of adjustment screws 70 and 72 which bear upon blocks 74 and 76.

The lowermost end of the sleeve 56 is provided with a coolant inlet conduit 78 which is secured thereto by any suitable means, such as welding, and which has a coolant supply conduit 80 attached thereto. The sleeve 56 is also provided near the outer surface of the block 52 with an outlet tube 82 which enters the sleeve 56 and extends therealong towards the bushing 60.

The operation of this embodiment is similar to that of the embodiment shown in Figure 1 in that a supply of coolant is fed to the inlet tube 78, flows along the electrode toward the bushing 60 and thence leaves the sleeve 56 from approximate the bushing 60 by means of the outlet tube 82 so that heat is transferred to the coolant by means of countercurrent flow.

Referring to Figure 3 there is shown still another embodiment of the invention wherein a tank block 90 having an aperture 92 is provided with an elongated sleeve or conduit 94 having an integral bushing 96 at the inner end thereof. The bushing 96 fits loosely around an electrode 98 which extends through the sleeve 94.

The other end of the sleeve 94 is counterbored and threaded at 100 to receive a flexible washer 102 which is held in position by means of a threaded hollow plug 104 having a wrench flange 106 at its outer end. A pair of coolant fluid conduits 108 and 110 pass through the washer 102, the conduit 108 terminating adjacent the washer 102 and the conduit 110 terminating adjacent the bushing 96. Fluid may be supplied to the conduits by means of flexible tubes 112 and 114.

The electrode assembly is held in position by means of an L-shaped strap 116 which is fastened to the outer surface of the sleeve 94 by any suitable means, such as by welding, and which is held in position by means of a jack screw 118 which passes through any suitable support 120. A further jack screw 122 passes through a support 124 and maintains the electrode 98 in position to avoid the electrode falling out of the tank block in the event that the supply of coolant fails.

The operation of this embodiment is similar to that of the embodiments shown in Figures 1 and 2 in that a supply of coolant is preferably fed to the tube 108 and withdrawn from the tube 110. It is also contemplated, however, that the fluid coolant may be fed to the conduit 110 and discharged approximate the bushing 96 and then withdrawn through the tube 108. With this type of cooling the coolant is preferably discharged with jet force against the bushing and electrode, although lesser discharge pressures are satisfactory to a lesser degree.

While this invention has been described in connection with vertical electrodes entering the bottom wall or floor of a glass furnace the disclosed electrode assemblies may be equally well utilized with horizontal or inclined electrodes. This application is a continuation-in-part of my copending application Serial No. 371,858, now Patent No. 2,693,498.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an electrode assembly in an apertured furnace wall, a sleeve in said aperture and having an end protruding from said wall, a bushing mounted in said sleeve at the end opposite from said protruding end, an electrode extending through said sleeve and said bushing, sealing means on said sleeve at the protruding end thereof providing a fluid seal between said sleeve and said electrode, and means for delivering a supply of coolant to said bushing and electrode.

2. In an electrode assembly in an apertured furnace wall, a sleeve in said aperture and having an end protruding from said wall, a bushing mounted in said sleeve at the end opposite from said protruding end, an electrode extending through said sleeve and said bushing, sealing means on said sleeve at the protruding end thereof providing a fluid seal between said sleeve and said electrode, means for introducing coolant into said sleeve proximate the protruding end thereof, and means for removing coolant from said sleeve proximate said bushing.

3. In an electrode assembly in an apertured furnace wall, a sleeve in said aperture and having an end protruding from said wall, a bushing mounted in said sleeve at the end opposite from said protruding end, an electrode extending through said sleeve and said bushing, sealing means on said sleeve at the protruding thereof providing a fluid seal between said sleeve and said electrode, means for introducing coolant into direct contact with said electrode proximate the protruding end of said sleeve, and means for removing coolant from said sleeve proximate said bushing.

4. In an electrode assembly in an apertured furnace wall, a sleeve in said aperture and having an end protruding from said wall, a bushing mounted in said sleeve at the end opposite from said protruding end, an electrode extending through said sleeve and said bushing, sealing means on said sleeve at the protruding end thereof providing a fluid seal between said sleeve and said electrode, means for introducing coolant into direct contact with said electrode proximate the protruding end of said sleeve, and a tube extending into said sleeve and terminating proximate said bushing for removing coolant from said sleeve.

5. In an electrode assembly in an apertured furnace wall, a sleeve in said aperture and having an end protruding from said wall, a bushing mounted in said sleeve at the end opposite from said protruding end, an electrode extending through said sleeve and said bushing, a closure on the protruding end of said sleeve surrounding said electrode and in fluid tight engagement therewith, means for introducing coolant through said closure into direct contact with said electrode, and means for removing coolant from said sleeve through said closure.

6. In an electrode assembly in an apertured furnace wall, a sleeve in said aperture and having an end protruding from said wall, a bushing mounted in said sleeve at the end opposite from said protruding end, an electrode extending through said sleeve and said bushing, a closure on the protruding end of said sleeve surrounding said electrode and in fluid tight engagement therewith, an inlet conduit in said closure for introducing coolant through said closure into direct contact with said electrode, and an outlet conduit passing through said closure and extending along said sleeve and terminating proximate said bushing.

7. In an electrode assembly in an apertured furnace wall, an elongated sleeve in said aperture and having an end protruding from said wall, a bushing mounted in said sleeve at the end opposite from said protruding end, an electrode extending through said sleeve and said bushing, a flexible washer encircling said electrode and engaging the protruding end of said sleeve, sealing means retaining said washer on said sleeve in fluid tight engagement therewith, an inlet conduit in said washer for introducing coolant through said washer into direct contact with said electrode, and an outlet conduit passing through said washer and extending along said sleeve and terminating proximate said bushing.

8. In an electrode assembly in an apertured furnace wall, an elongated sleeve having an end entering said aperture and having an end protruding from said wall, a bushing mounted in said sleeve at the end enclosed in said wall, an electrode extending through said sleeve and said bushing a flexible washer encircling said electrode and engaging the protruding end of said sleeve, sealing means retaining said washer on said sleeve in fluid tight engagement therewith, an inlet conduit in said washer for introducing coolant through said washer, and an outlet conduit passing through said washer and extending along said sleeve and terminating proximate said bushing.

9. In an electrode assembly in an apertured furnace wall, an elongated sleeve having an end protruding from said wall, a bushing of substantial axial length mounted in said sleeve at the end enclosed in said wall, an electrode extending through said sleeve and said bushing and having a loose fit in said bushing, a flexible washer encircling said electrode and engaging the protruding end of said sleeve, sealing means retaining said washer on said sleeve in fluid tight engagement therewith, an inlet conduit in said washer for introducing coolant through said washer into direct contact with said electrode, and an outlet conduit passing through said washer and extending along said sleeve and terminating proximate said bushing.

10. In an electrode assembly in an apertured furnace floor, an elongated sleeve having one end mounted within said floor and extending vertically downwardly from said floor, a bushing of substantial axial length mounted in said sleeve at the upper end thereof, an electrode extending vertically through said sleeve and said bushing and having a loose fit in said bushing, a flexible washer encircling said electrode at the lower end of said sleeve, sealing means removably attached to the lower end of said sleeve retaining said washer on said sleeve in fluid tight engagement therewith, an inlet conduit in said washer for introducing coolant through said washer into direct contact with said electrode, and an outlet conduit passing through said washer and extending vertically upwards along said sleeve and terminating proximate said bushing.

11. In an electrode assembly in an apertured furnace floor, an elongated sleeve having one end mounted within said floor and extending vertically downwardly from said floor, a bushing of substantial axial length mounted in said sleeve at the upper end thereof, an electrode extending vertically through said sleeve and said bushing and having a loose fit in said bushing, a flexible washer encircling said electrode at the lower end of said sleeve, sealing means removably attached to the lower end of said sleeve retaining said washer on said sleeve in fluid tight engagement therewith, an inlet conduit in said sleeve proximate the lower end thereof, and an outlet conduit passing through said sleeve and extending vertically upwards along said sleeve and terminating proximate said bushing.

12. In an electrode assembly in an apertured furnace wall, a sleeve in said aperture, a bushing mounted in said sleeve adjacent one end thereof, an electrode extending through said sleeve and said bushing, sealing means on said sleeve at the opposite end from said bushing providing a fluid seal between said sleeve and said electrode, and means for delivering a supply of coolant to said bushing and electrode.

13. In an electrode assembly in an apertured furnace wall, a sleeve in said aperture, a bushing mounted in said sleeve adjacent one end thereof, an electrode extending through said sleeve and said bushing, sealing means on said sleeve at the opposite end from said bushing providing a fluid seal between said sleeve and said electrode, and means for delivering a supply of coolant into said sleeve at the opposite end from said bushing, and means for removing coolant from said sleeve proximate said bushing.

14. In an electrode assembly in an apertured furnace wall, a sleeve in said aperture, a bushing mounted in said sleeve adjacent one end thereof, an electrode extending through said sleeve and said bushing, sealing means on said sleeve at the opposite end from said bushing providing a fluid seal between said sleeve and said electrode, means for delivering a supply of coolant into said sleeve proximate said bushing, and means for removing coolant from said sleeve at the opposite end from said bushing.

15 In a electrode assembly in an apertured furnace wall, a sleeve in said aperture, a bushing mounted in said sleeve adjacent one end thereof, an electrode extending through said sleeve and said bushing, sealing means on said sleeve at the opposite end from said bushing providing a fluid seal between said sleeve and said electrode, means for delivering a supply of coolant into said sleeve adjacent said bushing and electrode with jet force, and means for removing coolant from said sleeve at the opposite end from said bushing.

References Cited in the file of this patent

UNITED STATES PATENTS

| | | |
|---|---|---|
| 858,000 | Von Kugelgen | July 2, 1907 |
| 2,389,033 | Dubsky | Nov. 13, 1945 |
| 2,419,139 | Hopkins | Apr. 15, 1947 |
| 2,509,326 | Weaton et al | May 30, 1950 |
| 2,693,498 | Penberthy | Nov. 2, 1954 |